Figure 1:
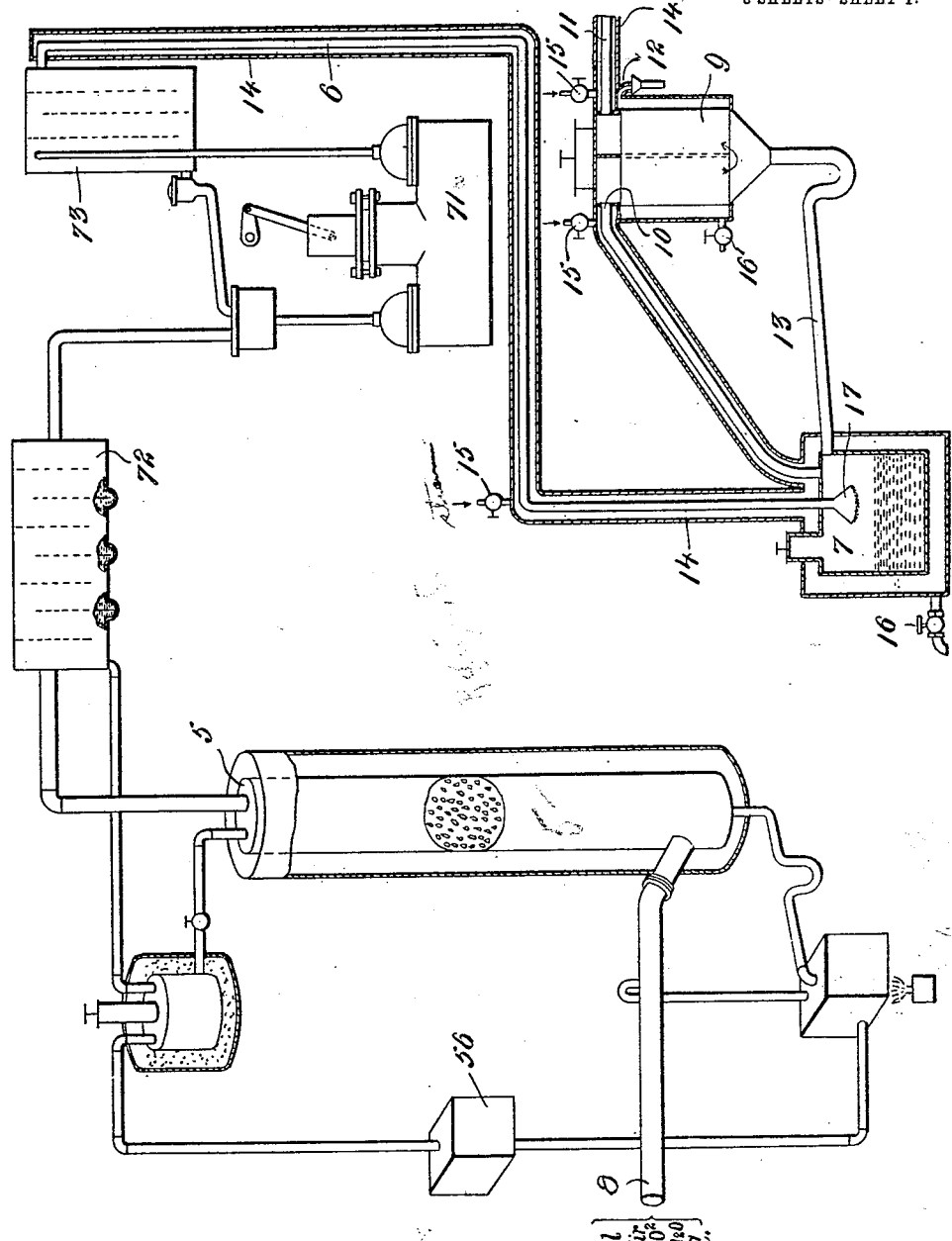

No. 872,205. PATENTED NOV. 26, 1907.
E. A. SPERRY.
PROCESS OF PRODUCING STANNIC CHLORID.
APPLICATION FILED APR. 13, 1906.

3 SHEETS—SHEET 1.

WITNESSES:

INVENTOR
Elmer A. Sperry.
By Buckingham & Ernst
Attorneys

No. 872,205.

PATENTED NOV. 26, 1907.

E. A. SPERRY.
PROCESS OF PRODUCING STANNIC CHLORID.
APPLICATION FILED APR. 13, 1906.

3 SHEETS—SHEET 2.

WITNESSES:
W F Roy
C. E. Dickensen.

INVENTOR
Elmer A. Sperry.
By Buckingham & Ewart
Attorneys

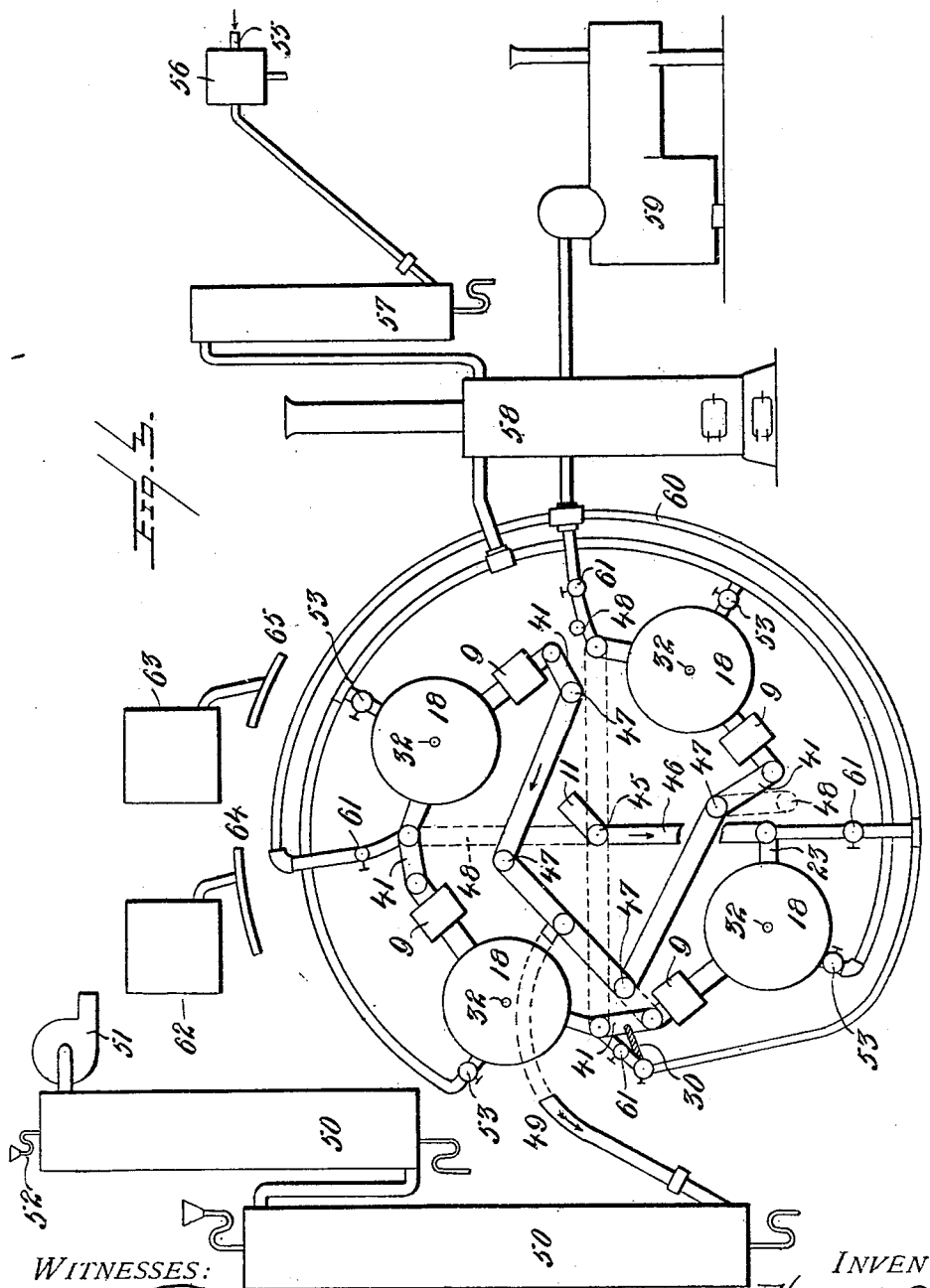

UNITED STATES PATENT OFFICE.

ELMER A. SPERRY, OF BROOKLYN, NEW YORK.

PROCESS OF PRODUCING STANNIC CHLORID.

No. 872,205.  Specification of Letters Patent.  Patented Nov. 26, 1907.

Application filed April 13, 1906. Serial No. 311,559.

*To all whom it may concern:*

Be it known that I, ELMER A. SPERRY, a citizen of the United States, residing at Brooklyn, in the county of Kings and State of New York, have invented new and useful Improvements in Processes of Producing Stannic Chlorid, of which the following is a specification.

This invention relates to a process of producing chlorids of tin, and particularly more than one of such chlorids or forms of chlorid simultaneously.

The process consists in any general arrangement of steps which will produce the result hereinafter outlined.

The product is produced by causing reactions to take place between any tin bearing material, such, for instance, as tinned iron or steel, usually known as tin scrap, or any form of metallic tin with other metals on the one hand, and chlorin in any of its reacting forms on the other hand; in the present instance the reaction being understood as taking place in the presence of the chlorid or chlorids of tin, that which is produced being added to such chlorids, the tin bearing material being understood as being submerged or inundated in the chlorids in whole or in part. The process is such that the chlorin may be derived from any of its commercial sources, ordinarily chlorin associated with other gases, air and more or less moisture being suitable; it being the purpose of the present invention to overcome the difficulties introduced by the presence of these foreign and associated materials.

I place the tin bearing material in any form of receptacle preferably submerged in a chlorid, preferably a chlorid of tin. This chlorid may be the anhydrous stannic chlorid usually but not necessarily associated with more or less chlorid in the hydrated form. Chlorin is brought into contact with the mass thus related and the reaction proceeds. Means, such for instance, as a jacket or the submerged coils, are provided for the purpose of controlling the temperature of the reaction. The chlorin and associated gases are first partly dried, preferably by refrigeration. This eliminates quite a percentage of the water, but never quite all of the water. The gases are then pre-treated with anhydrous stannic chlorid, either as a liquid or vapor, the gases preferably being heated prior to or during this part of the process, though this is not necessary thereto. Such moisture as still remains in the gas during this treatment, produces hydrated stannic chlorid. The gases are next passed through a condenser, condensers or equivalent apparatus for the purpose of eliminating excess of or any sublimed chlorids.

The excess of anhydrous chlorid trickles down and may be returned preferably to the impregnator, or may be caught and made to constitute part of the raw product, while some of the hydrated chlorid collects upon the walls, usually in crystalline form, and may be periodically removed; this also forms a raw commercial product. The chlorin and chlorid vapors, air, etc. are now preferably warmed to prevent further deposits of the hydrate, which may thereby choke the parts, conduits, pumps, exhausters, or equivalent, through which they may be led. The gases may now be pumped, blown, or otherwise propelled, forced or drawn into the next step of the process, preferably being warmed or heated as they travel or during the propelling process as above stated, the conduits being covered and insulated to prevent the escape of heat, or jacketed for the same purpose as the gases are being led from the propelling device to the reaction chamber. The chlorin and associated gases and vapors now reach the apparatus proper and are there brought into intimate contact with the mass of tin bearing material, preferably through the combined action of the body of chlorid or the chlorid upon or in contact with the surface of the tin to be reacted upon, which is at once wetted throughout with the chlorid thus produced; this chlorid takes up the thoroughly chlorinated chlorid and also the chlorin itself with great avidity. If a body of the chlorid is present this may take place either directly in the reaction chamber or in a separate inclosure for this purpose which communicates with the reaction chamber. The gases may be regurgitated through this body of liquid or pass in contact therewith over the surface of the liquid. In either case gases and vapors pass off the surface of the liquid, whether it be in a body or distributed as described. In this connection it is interesting to note that it has been found that the well known surface-equilibrium phenomenon favors the absorption and far less chlorin gas is found in the gases which collect above the surface when the liquid has been chlorinated by chlorin which has been absorbed and intimately associated with the chlorid vapors, and which have thus presumably become thoroughly saturated with the chlorin. The cholrin is thus carried into the liquid, seemingly under conditions which also favor its activity, as it is eventually liberated it is nascent and extremely active when introduced in this state of intimate association. Furthermore, it is seemingly due to the more vigorous reaction with the tin portions of the tin-bearing material that less chlorin is found to collect above the surface of the liquid, or to pass away from the body or mass or the wetted reacting surfaces described. The vapors and gases arising from the reaction chamber are now treated to recover their values. These values consist of stannic chlorid vapors, both hydrated and anhydrous air which is saturated at the temperature with such vapors and that which also is entrained and carried mechanically by such gases and vapors and also a small amount of chlorin gas arising from such surface-equilibrium phenomena as is not checked or neutralized by the described pretreatment of the gases.

Figure 2:
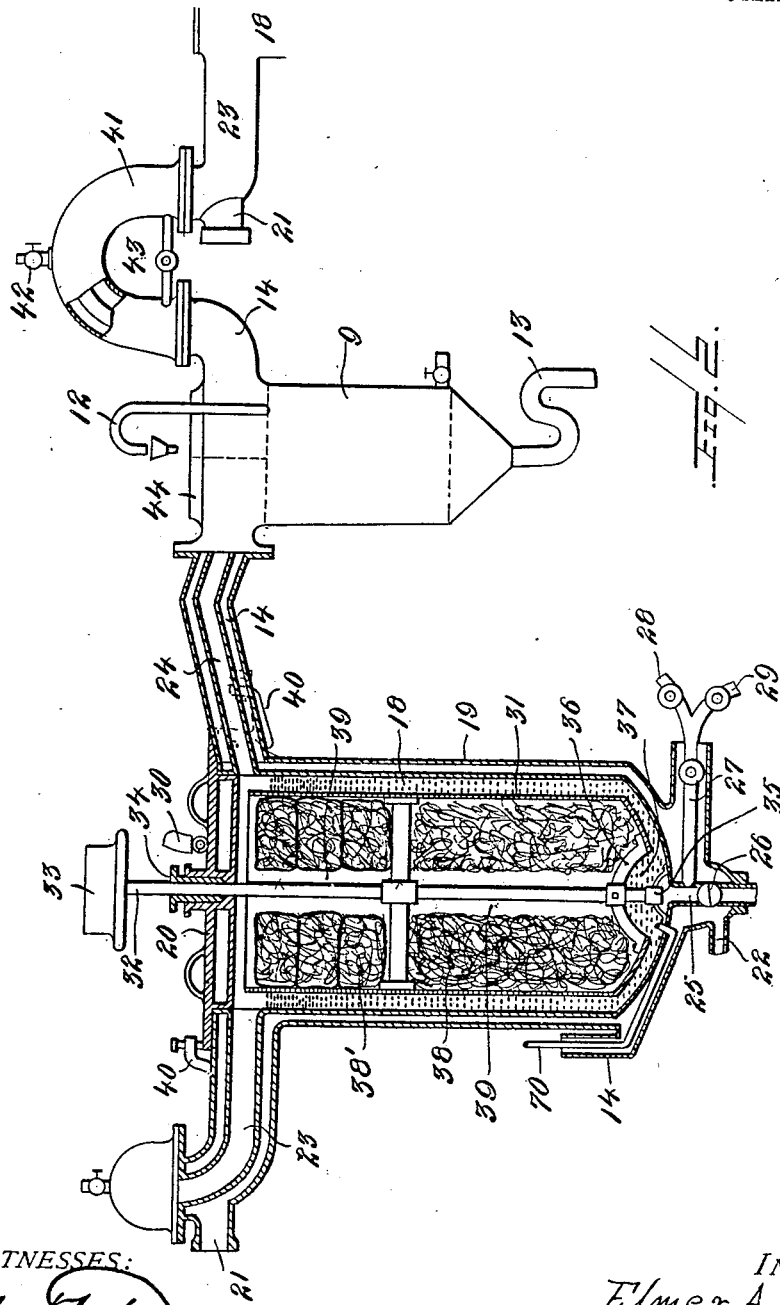

One form of apparatus in which the invention may be embodied is shown in the accompanying drawings, in which Figure 1 serves to illustrate one arrangement of treating apparatus, Fig. 2 a detail of one of the reaction vessels, and Fig. 3 a diagrammatic arrangement of the plant. The same reference characters indicate like parts throughout the drawings.

In Fig. 1, 5 indicates a refrigerating apparatus and 6 means whereby the gases are heated between the refrigerating apparatus and the treating apparatus 7. It will be seen that the chlorin, chlorin and air, moisture or other admixture of gases or vapors reach the apparatus at point 8 from any suitable source of supply, and after traversing the refrigerating and treating apparatus, pass to the condenser 9, whereby the excess liquid, vapors or solids are deposited. The gases reaching point 10 in this particular form of condenser, traverse downwardly through suitable passages to the bottom and thence upwardly on the right side to the eduction pipe 11. A visual overflow from the condenser is shown at 12 and eduction pipe and valve at 16', whereby the cooling medium is made to traverse the condenser. It will be seen that the arrangement of apparatus is such that the eflux material from condenser 9 may traverse conduit 13 and be returned to treating vessel 7. The jackets shown at 14, 14, etc. are supplied with suitable inlet devices 15 and outlet devices 16 as shown. Whereas these jackets are usually employed for heating purposes, yet they may be employed for cooling purposes as well without change of form. A distributer 17 is employed in the treating chamber 7 for an incoming supply and for bringing about better contact between treating materials and gases, as will readily be understood.

As a means for forcing the gases into the body of liquid or for propelling them or for any reason the gases are to be under pressure, a pump 71 is employed located at any suitable point of the system, as, for instance, immediately after the refrigerating and drying apparatus or between the defogging chamber 72 and the treating vessel 7, the inlet 6 of which is jacketed as shown from the point where it leads from the pump discharge drum 73. Passing now to the structure of one of the units of the plant, it will be seen that same consists essentially of a chamber 18, being provided with a jacket 19 and one or more removable ends or caps 20. The induction pipe for the jacket is shown at 21, 21, and the eduction pipe at 22. It will thus be seen that the gas inlet pipe 23 and outlet pipe 24 are jacketed in such a manner that their temperature is under control. Leading from the chamber are also other connections, one valved connection 25 at the bottom, the valve being indicated at 26, together with a jacketed connection 27, branches 28 and 29 supplied with valves as indicated. The end pieces, one of which is shown at 20, supplied with flexible connections to its jacket, shown at 30. The scrap in the present form of apparatus is loaded into a perforated rotating drum 31, mounted upon shaft 32, driven by any suitable means as by pulley 33, the shaft rising through a stuffing box 34 in one of the ends of the chamber 18. Suitable bearing as 35 supports one end of the shaft and the spiders 36—36 serve to connect the rotating drum with the shaft in such a manner as to leave a central opening 37, the object of which will appear. The scrap which was more or less tightly packed into the drum 31, after rotation, is carried out toward the periphery, remains more or less tightly compacted there and takes up the position indicated in the drawings and illustrated at 38, leaving central opening or channel, which is more or less free, indicated at 39, 39. The end or ends of the chamber are held thereupon removable as by clamps 40, one of which is shown in position after removal. Before loading the scrap into the cylinder 18 or the drum 31 it may be more or less tightly compacted or billeted as seen at 38'. Preferably so placed as to leave the central channel 39. On the under side of the chamber 18 and near its center is the chlorin inlet pipe 70, jacketed as shown at 14 and arranged to discharge near the base of the central opening or channel 39.

In Fig. 2, the inlet of a second chamber is shown at 23 to the right in the figure and the condenser 9 is also shown as between the two chambers 18—18, together with the removable connecting pipe 41, which may or may not be steam jacketed as shown. Where a jacket is used, the induction 42 and the eduction 43 are employed for the jacket. The condenser induction and eduction ports are identical with those in Fig. 1, as is also the discharge for material and both gas conduits may or may not be jacketed as the case may require. Where jackets are used, they are indicated by 14—14—14, as in Fig. 1. It will be seen that the condensers are provided with removable portions as 44 for giving free access to the interior thereof.

Fig. 3 represents a diagrammatic view of one form of plant embodying the invention. In this figure will be seen an arrangement involving a plurality of chambers 18. The general arrangement of piping is also shown coupling these chambers with the other elements of the plant which are indicated diagrammatically. In this figure the lower right chamber 18 is shown to be out of circuit and in a certain peculiar stage of the operation as a whole. The others, starting with the lower left hand container receive the treated chlorin which has passed through the portion of the plant shown in Fig. 1 and has been delivered, say to point 45, from which the swinging connection, or the equivalent 46, delivers it to the pipe 70 of the chamber mentioned, from which it passes in series through first the condenser 9, moving change pipe 41 which may be swung so as to connect with one of the covered openings 47, etc., as shown by dotted lines. It may also be swung to an intermediate position or blank 48, whereupon the pipe is closed, it being understood that the other openings are closed unless otherwise specified. After passing through the intermediate received 18 and condenser 9 the gases are drawn from the upper right hand condenser 9 with which the swinging pipe 41 is shown to be in connection with the opening 47 where it starts on its way, as indicated by the arrow, to the discharge pipe 49, connecting with the bottom of the tower 50, scrubber or its equivalent. The exhausting device 51, is used at the top of the tower 50', 52 being a feeding device for any suitable material, such as stannous chlorid, stannic chlorid or solvent. The swinging pipe 41 that connects with condenser 9 of the lower right hand container does not draw its supply from pipe 11 or point 45, but rather from valve 53, which is closed in case of the other chambers but open in the particular stage of operations we are now considering, to the lower right hand chamber only. The supply pipe 54 feeds this chamber with previously dried superheated air. As a drying means I have shown an induction aperture 55 leading to the refrigerator 56 and thence to a calcium chlorid tower or equivalent 57 and thence to the superheating furnace 58, serving in double capacity of superheating both air and steam supplied from any suitable source such as boiler 59, and supplying the distributing pipe 60 with superheated steam, preferably with a high degree of superheat. The supply of steam is regulated as by valves 61 &c. By this means it is possible to raise the temperature of any or all of the chambers to a very high degree and also to regulate the chambers of the various jackets. For some purposes it is desirable that the jackets should not be as high in temperature as the chambers 18. The branch pipes 28 and 29, (see Fig. 2) leading to the interior of these chambers are suitably connected for supply and drain to the two containers 62 and 63 leading to supply mains 64 and 65 whereby any of the chambers may receive a supply of water preferably under pressure from one or sodium hydrate or suitable solution from another, or simultaneously from both for the purposes described.

I have now described my invention, its method of operation will be apparent from the foregoing and may briefly be stated as follows: Chlorin or the mixture of gases or gases and vapors entering in pipe 8 pass through the various devices in Fig. 1 whereby the gases are pumped and treated so as to be associated with a predetermined quantity of a drying active and reactive agent, such for instance as tetra chlorid of tin which in its anhydrous liquid form is contained in vessel 7 filled through an aperture 7' and with which the gases are thoroughly commingled and impregnated under conditions of temperature control, as clearly indicated, and from which the excess to any desirable degree is excluded as by a varying amount of cooling, chilling or refrigerating taking place in condenser 9, Fig. 1, the excess being returned to treating vessel 7, as described. The gases are now again heated in conduit 11, transmitted to point 45 on Fig. 3 where they start on their route, through pipe 70 to the initial chamber and its contents or submerged mass; this may be the only chamber used, or, upon leaving this chamber, it may pass out by pipe 24 and thence in a clockwise direction, through a series of chambers and intermediate and final condensers 9, thence to tower or scrubber 50 as pointed out. It should be explained that while the direction of gas around series is clockwise, the direction of the progression of freshly filled cylinders or chambers 18 is counter-clockwise, thus it happens that the chamber that has been in longest is the one which receives the richest reaction agent from supply pipe 46, and the fresh material is acted upon by the residual chlorin or active reagent after it has been impoverished to a greater or less extent previously in the series. During the reaction period the heat of the reaction chamber 18 is adjusted by valve 61 to bring about the best condition as experience will indicate, but I have found that a varying temperature is desirable and generally speaking a manipulation of temperature, though varying back and forth should usually finish higher than at the start; for instance, the lower left hand chamber, as in the diagram, is the hottest of the three active chambers, the upper right hand being the coolest. The product is drawn from pipe 13 of the condensers 9 and also is withdrawn by adjusting or opening cock 26 at the base of the active chamber 18. Product in the form of solution is also withdrawn from base of tower 50, as will be readily understood.

The manipulation within the chamber during the progress of the reaction, vaporizing, washing, fixation and drying of the scrap is as follows: The shaft 32 being revolved as stated, the scrap tends to pile around the periphery leaving a channel in the center shown at 39, Fig. 2, which communicates with opening 37. The centrifugal action is useful in all steps of the operation above described in that it tends to mobilize the liquid stannic chlorid as it is developed upon the extensive surface of the scrap. It also gives a definite circulation to the liquid contents of the vessel 18 or to the body of chlorid by means of its centrifugal action preventing impoverishment of the chlorin factor of the liquid, as would be the case if the liquid were allowed to remain quiescent in contact with the tin. Where the scrap is not submerged in a mass of chlorid, the centrifugal action also tends to move the scrap in such a manner that the chlorin has better access to the surfaces which are in contact, and the valuable chlorid is not allowed to drain down through and come in contact with the extended surfaces below, but is ejected from the perforated sides of basket 31 where they run down walls of chamber 18 and are drawn off at 26, as stated. The centrifugal action is also useful in washing, drying, treating, heating and vaporizing purposes, inasmuch as it materially hastens these processes through its agitation and especially through its definite directive circulation to the liquids or fluids during the progress of their action.

When it is indicated that the scrap has become detinned in the vessel, preferably the first of the series, it is disconnected and is subjected to any suitable series of manipulations which will produce the result, as for instance the one now to be described. Assuming now that the lower right hand chamber 18 and its condenser 9 constitute a unit which has been disconnected for purposes of finishing the black scrap and introducing fresh scrap, the steps in the operation may be described as follows: The body of stannic chlorid is first drawn off and the chamber quite thoroughly drained while the centrifugal action progresses or is increased. The adjustable pipe 41 is left in connection with the tower through the opening 47 while the heat from the source of superheated steam supply is gradually augmented until the temperature is raised preferably still higher than during the reaction, even when it was longest in service. This is accomplished, for instance, by opening and adjusting valve 61 or opening a connection directly connecting pipe 60 with jacket 19 of chamber 18, this temperature should be brought to a point where the extended surface of the black scrap has been entirely freed from stannic chlorid hydrate which may have been gathered or been deposited from the abundant supply of this material present during the reaction period. Next the air valve 53 is open to the chamber 18 and dried hot air is drawn in which is made to pass over and in contact with the scrap, preferably while in its heated state and put through condenser 9. The entrained vapors not deposited in the condenser pass to the tower as before and with the result stated. The heat from the jacket together with that introduced in connection with the air should raise the scrap to a higher point than is necessary for a complete removal of the stannic chlorid either anhydrous or hydrated, as described. The terminal gases are led into contact with a solvent for the chlorid which may be also associated or constitute a solvent or absorbent for the chlorin, or the chlorin may be taken up farther along as hereinafter described. Water or stannous chlorid solution may represent the class of absorbents or solvents which may be employed in these steps or step of the process. Where the stannous chlorid is employed it is preferable, though not necessary, to use two or more towers, scrubbers or their equivalent as 50 and 50' using the strong solution so as to have a large excess in the second or last one whereby to dissolve the last traces of chlorid. It is well to feed the stannous chlorid through this last tower or unit with such speed that stannous chlorid will also come from the tower at the bottom. This solution now may or may not be diluted and the solution used with the excess chlorin present in the first or early part of this step in the process or the first tower or towers, where it is converted into stannic chlorid carrying an excess of chlorin, which when finished may be considered as one of the desired product. This, or preferably a portion thereof, may be thrown back into stannous chlorid for use in the last part of the step or the last tower 50' in any suitable manner, such, for instance, as the addition of tin, or preferably by electrolysis with insoluble electrodes under conditions favoring elimination of chlorin and returning the chlorin to the system.

The absorbing tower or towers are so arranged that their temperatures may be controlled and adjusted for best results and for preventing production of by-products. The conduits throughout, by means of which the gases are conducted from one point to another, should also be controlled as to temperature or other means employed to prevent condensation and choking during the process.

The order of the steps and their detail may be varied, and some may be employed without the others, and the invention extends to such use.

I claim:

1. The process of producing stannic chlorid, which consists in reacting upon the tin-bearing material in a suitable anhydrous liquid with chlorin associated with gaseous tin chlorid.

2. In the process of producing stannic chlorid, which consists in reacting upon the tin-bearing material with chlorin, the steps of treating the gases by refrigeration, passing the same into contact with a liquid moisture-absorbent, prior to passing the gases into contact with the tin-bearing material.

3. The process of producing stannic chlorid, which consists in reacting upon the tin-bearing material in a suitable liquid chlorid, with chlorin contained in warmed tin chlorid vapors.

4. The process of producing stannic chlorid, which consists in reacting upon the tin-bearing material in liquid tin chlorid, with gaseous tin chlorid and chlorin, by bringing same over the surface of the liquid.

5. The process of producing stannic chlorid, which consists in reacting upon the tin-bearing material in liquid tin chlorid, with gaseous anhydrous stannic chlorid and chlorin, by bringing same over the surface of the liquid.

6. The process of producing stannic chlorid, which consists in reacting upon the tin-bearing material in liquid tin chlorid, with gaseous stannic chlorid contained in air and chlorin, by bringing same over the surface of the liquid.

7. In the process of producing stannic chlorid, which consists in reacting upon the tin-bearing material with chlorin, in the presence of anhydrous stannic chlorid, the steps of treating the chlorin by refrigeration, to remove moisture, and then heating and passing same into contact with the tin-bearing material.

8. In the process of producing stannic chlorid, which consists in reacting upon the tin-bearing material in liquid tin chlorid, with chlorin at an elevated temperature, the method of quickly bringing about an intimate association between the chlorid of tin and chlorin, consisting of commingling them when in a gaseous state, at an elevated temperature, and treating the tin-bearing material while still at an elevated temperature.

9. In the process of producing stannic chlorid, which consists in reacting upon the tin-bearing material in liquid tin chlorid with chlorin, the method of bringing about an intimate association between the chlorid of tin and chlorin, consisting of commingling them when in a gaseous state, and treating the tin-bearing material with the mixture.

10. The process of producing stannic chlorid, which consists in reacting upon the tin-bearing material with chlorin, the steps of treating the gases by heating them and then passing them into contact with anhydrous tannic chlorid, prior to the reaction.

11. In the process of producing stannic chlorid, which consists in reacting upon the tin-bearing material with chlorin, the steps of treating the gases by passing them into contact with anhydrous stannic chlorid and then cooling them, out of contact therewith, prior to the reaction.

12. In the process of producing stannic chlorid, which consists in reacting upon the tin-bearing material with gaseous chlorin, the steps of treating the chlorin with a body of $Sn Cl_4$, to dry same, removing the gases from contact with such body, heating and propelling them into contact with the tin-bearing material, while still at an elevated temperature.

13. In the process of producing stannic chlorid, which consists in reacting upon the tin-bearing material with gaseous chlorin, in the presence of liquid stannic chlorid, the steps of treating the gas to dry same, heating to a point above the congealing point of hydrated stannic chlorid and propelling same into contact with the tin-bearing material.

14. In the process of producing stannic chlorid, which consists in reacting upon the tin-bearing material with gaseous chlorin in the presence of liquid stannic chlorid, the steps of treating the gas to dry the same, heating, propelling same into contact with the tin-bearing material and insulating the gas against substantial loss of heat in transit.

15. In the process of producing stannic chlorid, which consists in reacting upon the tin-bearing material with chlorin, the steps of treating the gases by refrigeration to remove some of the moisture, and then heating the gases and passing same into contact with a liquid moisture-absorbent, prior to passing the gases into contact with the tin-bearing material.

16. In the process of producing stannic chlorid which consists in reacting upon the tin-bearing material with chlorin, the steps of treating the gases by refrigeration to remove some moisture, and then heating and passing same into contact with Sn Cl$_4$ to remove the remaining moisture, prior to passing gases into contact with the tin-bearing material.

17. In the process of producing stannic chlorid, which consists in reacting upon the tin-bearing material with chlorin, the steps of treating the gases by refrigeration and then heating and passing same into contact with a drying agent, and cooling the second time, prior to passing gases into contact with the tin-bearing material.

18. In the process of producing stannic chlorid, which consists in reacting upon the tin-bearing material with chlorin, the steps of treating the gases by refrigeration, and then heating and passing same into contact with a drying agent, and cooling the second time and again raising the temperature, prior to passing the gases into contact with the tin-bearing material.

19. In the process of producing stannic chlorid, which consists in reacting upon the tin-bearing material with chlorin, the steps of treating the gases by passing them into contact with a liquid drying agent, removing them from contact therewith, and then cooling them for the purpose of removing excess of the drying agent, and passing same into contact with the tin-bearing material.

20. The process of producing stannic chlorid, which consists in reacting upon the tin-bearing material, with chlorin in excess in the presence of liquid anhydrous stannic chlorid, and bringing the product into contact with an absorbent for chlorin.

21. The process of producing stannic chlorid, which consists in re-acting upon the tin-bearing material with chlorin in excess in the presence of liquid anhydrous stannic chlorid, and bringing the gaseous product into contact with an absorbent for stannic chlorid vapors and chlorin.

22. The process of producing stannic chlorid, which consists in reacting upon the tin-bearing material with chlorin, and bringing the gaseous product into contact with an absorbent for stannic chlorid vapors, and then with an absorbent for chlorin, in a plurality of steps.

23. The process of producing stannic chlorid, which consists in reacting upon the tin-bearing material in liquid tin chlorid with gaseous chlorin and bringing same over the surface of the liquid and leading the vapors into contact with an absorbent for chlorin.

24. The process of producing stannic chlorid which consists in reacting upon the tin-bearing material in liquid tin chlorid with gaseous chlorin, and bringing same over the surface of the liquid, and leading the vapors arising from the surface into contact with solvents for stannic chlorid vapors and chlorin.

25. The process of producing stannic chlorid, which consists in reacting upon the tin-bearing material with chlorin and bringing the gaseous product into contact with water and tin, thereby producing solutions of chlorid of tin.

26. The process of producing stannic chlorid which consists in reacting upon the tin-bearing material with chlorin and bringing the gaseous product into contact with stannic chlorid, with excess of chlorin, and afterward into contact with stannous chlorid maintained in excess.

27. The process of producing stannic chlorid, which consists in reacting upon the tin-bearing material with chlorin in excess, in the presence of liquid anhydrous stannic chlorid and bringing the gaseous product into contact with an artificially cooled absorbent for chlorin.

28. The process of producing stannic chlorid which consists in re-acting upon tin-bearing material with chlorin, in the presence of anhydrous stannic chlorid, preventing the temperature of the gaseous products from falling below a predetermined point, and bringing such gaseous product into contact with a suitable solvent.

29. In the process of producing stannic chlorid which consists in reacting upon the tin-bearing material with chlorin and water vapor, the steps of treating the gases by refrigeration to control the amount of water present, and then heating the gases and passing the same into contact with the tin-bearing material.

30. The process of producing stannic chlorid, which consists in reacting upon the tin-bearing materal, with chlorin in excess, and bringing the gases, the stannic chlorid vapors and the excess chlorin into contact with water, thus producing solutions of tin chlorid and treating such solutions for the removal of chlorin.

31. The process of producing stannic chlorid, which consists in reacting upon the tin-bearing material with chlorin in excess, and bringing the gases, the stannic chlorid vapors and the excess of chlorin into contact with water, thus producing solutions of tin chlorid with excess of chlorin, and bringing the product into presence of tin to remove excess of chlorin.

In testimony whereof I have hereunto set my hand in presence of two subscribing witnesses.

ELMER A. SPERRY.

Witnesses:
MARGARET HICKEY,
ANNA T. BURT.